Nov. 22, 1938.                T. D. PARKIN                2,137,304
                        PIEZOELECTRIC CRYSTAL HOLDER
                          Filed June 19, 1936          3 Sheets-Sheet 1
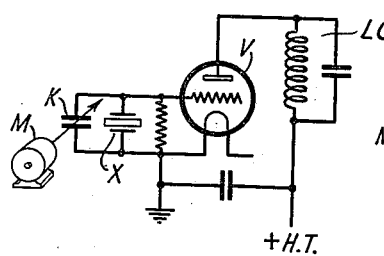
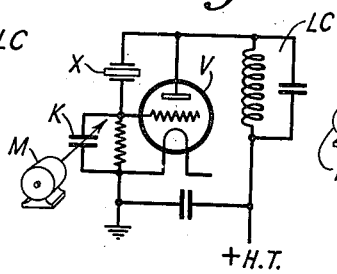
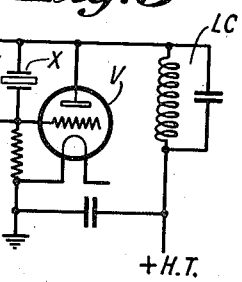
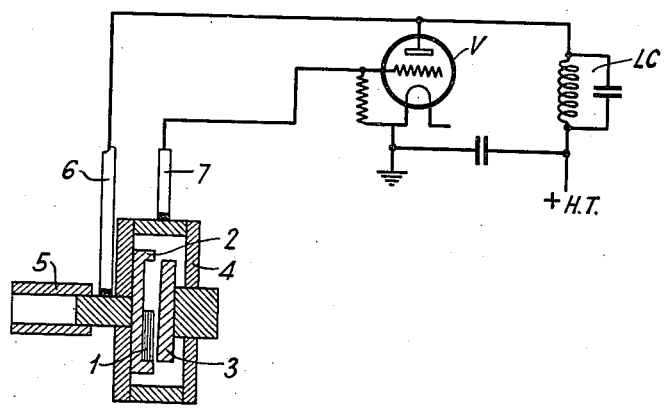
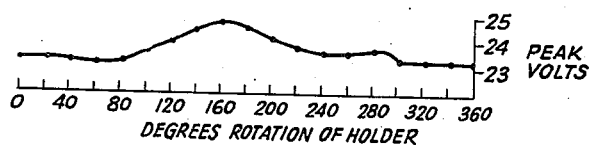
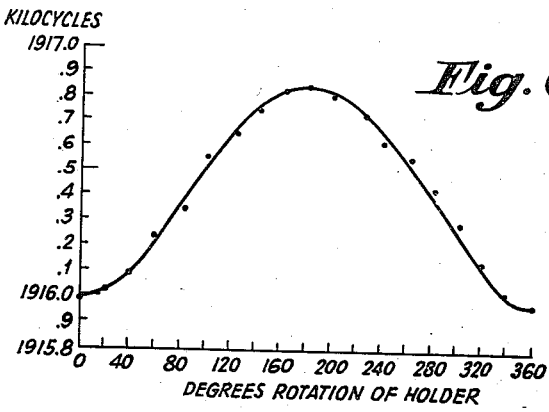
INVENTOR
THOMAS D. PARKIN
BY
ATTORNEY Nov. 22, 1938.  T. D. PARKIN  2,137,304
PIEZOELECTRIC CRYSTAL HOLDER
Filed June 19, 1936   3 Sheets-Sheet 2

INVENTOR
THOMAS D. PARKIN
BY
ATTORNEY

Nov. 22, 1938.　　　　T. D. PARKIN　　　　2,137,304
PIEZOELECTRIC CRYSTAL HOLDER
Filed June 19, 1936　　　3 Sheets-Sheet 3

INVENTOR
THOMAS D. PARKIN
BY
ATTORNEY

Patented Nov. 22, 1938

2,137,304

UNITED STATES PATENT OFFICE 2,137,304

PIEZOELECTRIC CRYSTAL HOLDER

Thomas Dixon Parkin, Broomfield, near Chelmsford, England, assignor to Radio Corporation of America, a corporation of Delaware Application June 19, 1936, Serial No. 86,026
In Great Britain July 5, 1935

9 Claims. (Cl. 171—327)

This invention relates to piezo-electric crystal arrangements and has for its object to provide an improved crystal arrangement which will exhibit a continuously varying natural frequency.

It is frequently required—for example for the purpose of obtaining secrecy in radio telephone systems—continuously to vary the frequency of a crystal oscillator. One expedient sometimes adopted to this end is to provide a small variable condenser comprising two diametrically opposed 90° stators co-operating with a double quadrant rotor rotating between them. Such a condenser is placed in shunt across some part of the oscillator circuit and its rotor is continuously varied by means of an electric motor.

Figure 7:
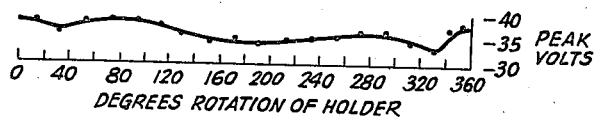
Figure 8:
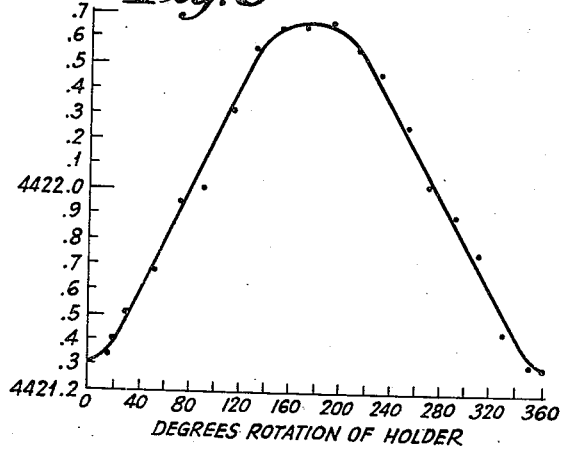
Figure 9:
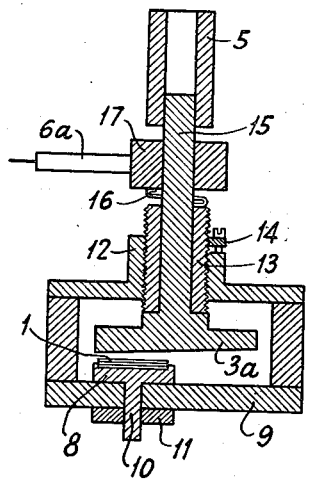
Figure 10:
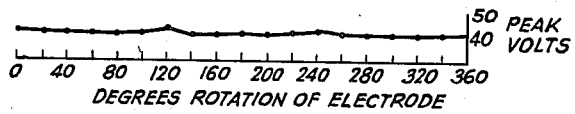
Figure 11:
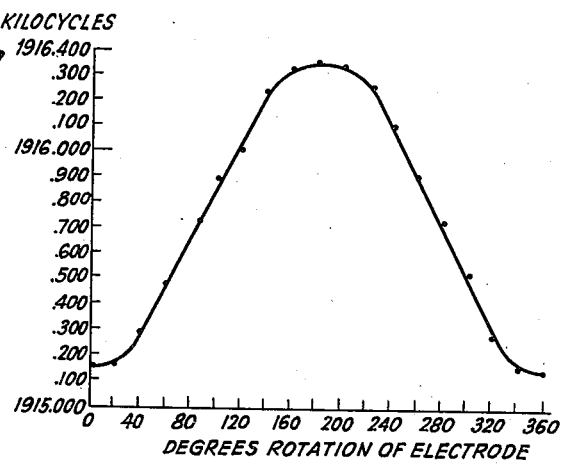
Figure 12:
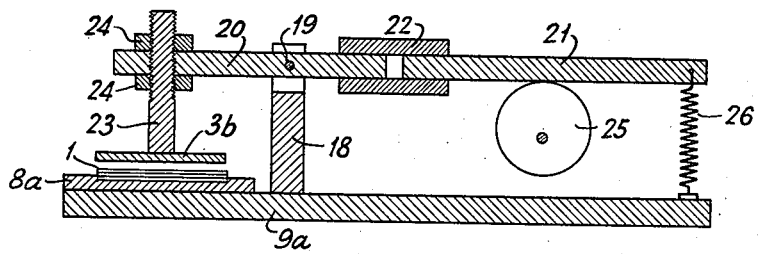

My invention will now be described in full detail, reference being made to the accompanying drawings in which Figures 1, 2 and 3 show three well known forms of crystal oscillator in connection with which my invention is found to be useful, Fig. 4 shows a crystal in its holder, the structure of which forms part of my invention, Figs. 5, 6, 7, 8, 10, 11, 13 and 14 are curve diagrams which are referred to in explaining the theory and performance characteristics of my invention, and Figs. 9 and 12 are cross-sectional views of my improved crystal holder, each showing a different embodiment thereof.

In Figs. 1, 2 and 3 an oscillator valve V is shown having the usual tuned anode circuit LC. Connected in the input circuit is the crystal X and the variable condenser K which is continuously varied by means of an electric motor M which rotates the rotor.

In these three arrangements the frequency generated will vary with rotation of the condenser rotor but this method of securing frequency variation has two important limitations or defects, namely that the amount of variation obtainable is limited. In practice it has been found that a variation in excess of about 1 part in 20,000 is difficult if not impossible to obtain. Furthermore, the voltage output from the oscillator varies to a serious extent during rotation of the condenser rotor. A frequency variation of 1 part in 20,000 is sufficient if the mid-frequency at the output of the system is high—e. g. if the mid-frequency is 16,000 k. c. a variation of 1 part in 20,000 would give a frequency variation of ±400 cycles which in this case would generally be regarded as sufficient. If, however, the mean frequency were only 4,000 k. c. a variation of 1 part in 20,000 would give a frequency variation of only ±100 cycles, which is not sufficient for such purposes as obtaining secrecy by carrier wobbling in a radio telephone system.

As regards the variation of voltage output which accompanies frequency variation in systems as illustrated in Figs. 1 to 3, this is so marked that it is often possible by suitably adjusting the condenser K, to reduce the voltage to zero.

It is well known that the frequency of a crystal oscillator depends at least in part upon the gap between the electrodes between which the crystal is positioned. The present invention takes advantage of this face to provide an improved continuously variable crystal arrangement not presenting the severe limitations or defects of known arrangements such as those which depend upon the use of a motor driven variable condenser.

According to this invention there is provided in combination a piezo-electric crystal, electrodes associated therewith, and means for continuously varying the effective separation between the crystal and at least one of the electrodes associated therewith.

In a preferred embodiment of the invention a circular crystal is employed and is arranged between two electrodes one on each side of said crystal, said electrodes having faces inclined to one another and said crystal being loosely mounted in a recess in one of the electrodes. The electrodes are considerably larger than the crystal diameter (preferably about twice the crystal diameter) and means are provided for slowly rotating the whole arrangement so that as the electrodes rotate the circular crystal is impelled by gravity to run around the inner edge of the recess in the recessed electrode, so that its spacing from the other electrode continuously and cyclically varies.

The primary application of the invention is to radio telephone transmitters where it may be employed to "wobble" the transmitted carrier. "Wobbling" of the transmitted carrier of a radio telephone transmitter is a well known expedient for securing a measure of secrecy in transmission this expedient being preferably employed in combination with the other well known expedient of "inverting" the speech frequencies.

The effect of "wobbling" a carrier frequency of a radio telephone transmitter is to make it difficult for an unauthorized receiver to listen in to the message transmitted, for, generally speaking, an unauthorized amateur will not be in a position to follow the "wobbling" of the carrier, whereas the authorized receiver, which will be of the superheterodyne and inverter or other suitable "privacy" type, is designed with an intermediate frequency channel of sufficient band width to accommodate the "wobble" so that the effect of "wobbling" is merely to move the signal band to and fro in the immediate frequency channel. In practice a "wobble" of some 400 or 500 cycles at a comparatively slow rate is desirable and by using the present invention this amount of "wobble" can easily be obtained. Preferably in addition to "wobbling" the carrier, the audio frequencies are "inverted" as known per se. Thus, the audio frequencies may be caused to beat with an oscillation of say 3,000 cycles per second so as to obtain "inverted" speech, that is to say frequencies equal to the differences between 3,000 cycles per second and the original speech frequencies. These "inverted" speech frequencies are applied at the transmitter to modulate the carrier which is "wobbled". At the receiving end accordingly the output resulting from demodulation will be "inverted" speech and this is re-inverted by means of a local oscillator of appropriate frequency so as to reproduce the original speech.

One form of varying frequency crystal arrangement in accordance with this invention is illustrated in the accompanying Fig. 4.

Referring to Fig. 4 a crystal 1 of circular or disc-like form, is freely mounted with its circular plane faces approximately vertical in a circular recess of slightly less depth than the thickness of the crystal and formed in a circular electrode 2 which constitutes one of the associated electrodes of the crystal. Preferably the diameter of the recess is as shown twice the diameter of the crystal. The other associated electrode 3 of the crystal is so mounted that the face adjacent the crystal makes a slight angle with the face of the recess in the electrode 2. The electrode 3 which may be arranged to be adjustable towards and away from the crystal is so positioned to leave a slight air space between its inclined face and the adjacent crystal face.

Thus with this arrangement the crystal is freely positioned between the two electrodes 2, 3 being slightly spaced from the electrode 3 which has the inclined face. The electrode 2 has its operative face at right angles to the approximately horizontal axial line of the whole system so that the crystal stands as it were on edge, and gravity will cause it to remain at the bottom of the circular recess as shown. The crystal and associated electrodes are mounted in a suitable box or housing 4 which is carried upon the approximately horizontal shaft (not shown) of an electric motor (not shown) and is driven thereby through an insulating coupling 5. Connection to the electrodes 2, 3, is made via brushes 6, 7, running on suitably insulated and connected slip rings carried by the box or forming part thereof. When the motor is rotated the box or housing rotates therewith and the crystal accordingly runs round the circular edge of the recess. During this action the spacing of the crystal from the inclined face of the unrecessed electrode varies, and accordingly the effective natural frequency of the whole arrangement will vary in a continuous manner. The brushes which constitute the terminals of the whole varying frequency arrangement are connected in any maner well known per se, so that the crystal is able to control the carrier frequency of a transmitter. For example, as shown, one brush may be connected to the grid of an oscillator valve V in the transmitter and the other brush to the anode.

The invention is not limited to the precise mechanical arrangement above described; for example the required variations of spacing between the crystal and an associated electrode may be obtained by arranging the said electrode to be movable and driving it to and fro so as to alter the air gap between it and the adjacent crystal face.

In one embodiment constructed as illustrated in Fig. 4 the diameter of the crystal was 16.08 mm., the thickness of the crystal was 1.02 mm., the effective diameter of the electrode 2 (the diameter of the circular recess) was 31.8 mm., the diameter of the face of electrode 3 was 33 mm., and the angle between the operative inclined electrode faces was 21 minutes. With this arrangement the highest natural frequency obtained was 1916.852 k. c. and the lowest 1915.988 k. c., giving a frequency difference of 864 kilocycles per second, or one part in 2217. Though some variation in peak output voltage occurred it was relatively small, being only (in this particular case) from 23 to 24.7 volts. These results obtained are shown more fully in graphical form in the accompanying Figs. 5 and 6, Fig. 5 showing peak voltage output plotted against rotation in degrees and Fig. 6 showing frequency in k. c. plotted against the same abscissa quantity. Since the circular crystal is kept at its lowest position by gravity, it is essential that the driving motor speed be not high enough to cause the development of such centrifugal force as will prevent the required action being obtained, and in practice, with the embodiment above numerically specified a speed of 80 revolutions per minute was employed and found not to be too high.

It is not necessary and is not always convenient for the crystal to be half the diameter of the recess in which it runs, though these relative dimensions give satisfactory results. The accompanying Figs. 7 and 8 which correspond respectively to Figs. 5 and 6 show graphically the results obtained when the crystal in the particular construction above described in dimensioned detail was replaced by a circular crystal 22.75 mm. in diameter and .43 mm. thick. It may be noted that the larger crystal was not so good in action as the smaller.

Another embodiment of the invention is illustrated in the accompanying Fig. 9. In this construction the crystal 1 rests in a small dished lower electrode 8 which is mounted eccentrically on an insulating base 9, e' g' by means of a stem 10 and nut 11. The base 9 forms part of a box or housing the upper portion of which has a central internally threaded tubular extension 12 into which is screwed a tubular guide 13. The guide 13 is longitudinally adjustable in the extension 12 and may be locked in any position of adjustment as by means of a screw locking arrangement schematically represented at 14. Passing through the guide 13 is a shaft 15 which is rotated by a motor (not shown) through a coupling 5 and which terminates at its lower end in an electrode 3a having its face inclined to the adjacent crystal face. A spring washer 16 is provided between the upper end of guide 13 and a collar 17 on the shaft 15 and means (not shown) are provided for preventing the shaft 15 moving downwards to bring the electrode 3a in contact with the crystal. Insulation is provided as necessary and the two external connections to the whole arrangement are made via the stem 10 and a brush 6a.

It will be seen that as the electrode 3a rotates the frequency is varied, since its distance from the said electrode varies.

The advantages of the arrangement of Fig. 9 over that of Fig. 4 include the following:—(1) The crystal does not roll on its edge and is not in mechanical rubbing or rolling contact with anything—it is therefore not likely to suffer wear or damage; (2) the only revolving part is the upper electrode 3a, so that there is only one rubbing contact; (3) the crystal holder can be rigidly held in position; and (4) adjustment of the mean distance between the crystal and electrode 3a is easily obtained by screwing the guide 13 in or out of the extension 12.

In one actual embodiment as illustrated in Fig. 9 a circular crystal 16.08 mm. diameter and 1.02 mm. thick was employed and the electrode 3a was 33 mm. in diameter and had a face inclination of 25 minutes. The lower electrode and crystal were situated just inside a circle of diameter equal to that of the upper electrode 3a. The results obtained with these dimensions are shown graphically in the accompanying Figs. 10 and 11 which correspond respectively to Figs. 5 and 6.

Yet another embodiment of the invention is illustrated in the accompanying Fig. 12. Here the crystal 1 is mounted in a dished lower electrode 8a mounted on an insulating base 9a upstanding from which is a support 18 in which is pivoted at 19 a beam consisting of two portions 20, 21, mechanically united but insulated from one another by an insulator member 22. Above the crystal is an upper electrode 3b carried by a stem 23 screwed into the beam member 20 and locked in any desired position of adjustment by nuts 24. The beam is oscillated by an eccentric disc or cam 25 driven by a motor (not shown) the said beam being held up against the disc or cam face in any convenient way as by a spring 26.

With this arrangement adjustment of the mean frequency may be obtained by means of the screwed member 23 and adjustment of the variation extent may be obtained by moving the cam or disc towards or away from the fulcrum 19 so that the leverage thereof is varied.

Figure 13:
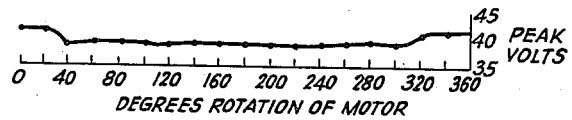
Figure 14:
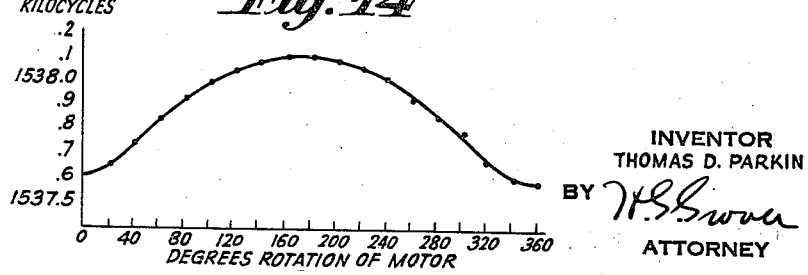

With an arrangement as illustrated in Fig. 12, using a square crystal 23.3 mm. x 23.3 mm. x 2.23 mm. thick, results as shown graphically in the accompanying Figs. 13 and 14 were obtained.

The invention is not limited to the particular mechanical arrangements above described and illustrated and various modifications will suggest themselves to those skilled in the art.

I claim:

1. In combination, a piezo-electric crystal, a crystal holder having oppositely facing electrodes between which said crystal is supported, the face planes of said electrodes being non-parallel to one another, and rotatable means for continuously varying the effective separation between said crystal and at least one of said electrodes.

2. Apparatus according to claim 1 and having at least one of the electrodes eccentric with respect to the crystal and means for producing relative rotary movement between the crystal and said electrode thereby to continuously vary the effective separation therebetween.

3. Piezo-electric crystal apparatus comprising a crystal of circular disc formation, means including a recessed electrode mounted for continuous rotation on a horizontal axis, thereby to support said crystal on its edge and to permit of rolling said crystal within the recess of said electrode, and another electrode having a face thereof disposed in a non-parallel relation to the recessed face of the first said electrode.

4. Apparatus as claimed in claim 3 and wherein the diameter of the crystal is approximately one half of that of the circular recess.

5. Piezo-electric crystal apparatus comprising a circular crystal and electrodes facing opposite sides of said crystal, the faces of said electrodes being inclined to one another and one of said electrodes being mounted for continuous rotation on an axis eccentric to that of the crystal.

6. In combination a piezo-electric crystal, two electrodes between which said crystal is mounted for free vibration at one of its natural frequencies, and rotatable means for moving one of said electrodes continuously and cyclically with respect to the other electrode, thereby to continuously vary the inter-electrode spacing and hence the frequency of vibration of said crystal.

7. Apparatus according to claim 6 and having a lever system for supporting one of said electrodes, and means including a rotatable cam in engagement with said lever system for oscillating said electrode.

8. The method of varying the responsive frequency of a piezo-electric crystal oscillator of circular disc formation which comprises continuously rolling said crystal on its circular edge within a space bounded by non-parallel electrode faces.

9. In the art of oscillating a piezo-electric crystal between its electrodes, the method of periodically "wobbling" the frequency of said crystal which comprises rotating at least one of its electrodes on an axis eccentric to the center of the crystal and continuously varying the effective spacing between the electrodes.

THOMAS DIXON PARKIN.